(12) United States Patent
Tham et al.

(10) Patent No.: US 6,418,818 B1
(45) Date of Patent: Jul. 16, 2002

(54) APPARATUS AND METHOD FOR MANIPULATING A SCREW

(75) Inventors: Chong Fong David Tham; Chiew Kum Ng; Siang Ong, all of Singapore (SG); Ricky Chong Ho Tan, Johor Bahru (MY); Keat Ching Tay; Jennie Whye Chin Tan, both of Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/677,256

(22) Filed: Oct. 2, 2000

(30) Foreign Application Priority Data

Oct. 1, 1999 (SG) .............................................. 9904818

(51) Int. Cl.[7] .............................................. B25B 13/00
(52) U.S. Cl. ......................................... 81/54; 294/119.1
(58) Field of Search .............................. 81/54, 55, 453; 294/94, 102.1, 119.1

(56) References Cited

U.S. PATENT DOCUMENTS

| 3,368,431 A | * | 2/1968 | Kulaga | ........................ | 81/54 |
| 4,363,250 A | * | 12/1982 | Suga | ........................ | 81/453 X |
| 5,207,127 A | * | 5/1993 | Nick | ........................ | 81/54 |
| 5,791,212 A | * | 8/1998 | Han | ........................ | 81/453 |

* cited by examiner

Primary Examiner—James G. Smith
(74) Attorney, Agent, or Firm—Robert B. Martin; Bracewell & Patterson, L.L.P.

(57) ABSTRACT

An apparatus for use with a torque driver for engaging the head of a screw and enabling a screw to be picked up is disclosed. The apparatus includes a sleeve that longitudinally extends from and retracts into the apparatus. The apparatus also includes a gripper for gripping the head of the screw. The gripper is actuated by the sleeve to widen and close in response to extension and retraction of the sleeve.

33 Claims, 6 Drawing Sheets

1. F1 = F2 = F3
2. F1, F2, F3 pass through centre

Bit Extended

APPARATUS AND METHOD FOR MANIPULATING A SCREW

BACKGROUND OF THE INVENTION

1. Technical Field

The present invention relates in general to manipulating a screw and, more particularly, to device for use with a torque driver for engaging the head of a screw and picking up the screw.

2. Description of the Related Art

In manufacturing industries, different parts of a product under manufacture are often held together or fastened by means of screws. The parts to be fastened typically contain corresponding holes with screw threads for receiving the screws, the screws also having reciprocating screw threads. The screws are inserted into these screw holes and then threadingly engaged. When the screws are tightened, the parts are held together by these screws.

While fastening things using screws, many problems may occur. For example, if the screws are not inserted perpendicularly into the screw holes, the screw threads on either or both of the screw holes and screws may be damaged when the screws are tightened. This is because the screw threads on the screw may cut the screw threads in the screw holes, or vice-versa, in a process known as cross-threading, thereby causing the damage. Other examples of problems that may arise when fastening things using screws relate to the picking up of the screws. Screws may be picked up manually by an operator, or using a tool that the operator may also use for tightening the screws. In a conventional tool for picking up screws, magnetic means or suction means may be used. In relation to conventional tools using the suction means, one problem that may arise concerns the size and/or weight of the screw. Screws vary in type and sizes. Such conventional tools, however, may not adequately enable the operator to pick up larger and heavier screws. This is because the suction means is dependent on vacuums in the conventional tools, and the vacuums are in turn produced by air removal devices that are attached to the conventional tools. If an air removal device is not powerful enough, the vacuum produced may not enable the operator to pick up larger and heavier screws. On the other hand, if the air removal device is provided with increased power to enable the conventional tools to pick up the larger and heavier screws, the effect might be undesirable as screw release or drop-off operations may be harder to control. Alternatively, if there is sudden loss of vacuum due to a fault or inconsistency in the air removal device, a screw being picked up may be dropped by the attached conventional tool. Hence, even the smallest screw may not be picked up in this circumstance.

In relation to conventional screw pick-up tools that utilize magnets or apply magnetic fields, an attendant problem that is important is the limitation of the effect of such conventional tools on non-austenitic metal. Austenitic metals, that is, metals formed largely of stainless steel, are not affected by magnets or magnetic fields. Hence, the conventional tools using magnetic means cannot be used to pick up Austenitic screws. In some manufacturing industries, it is important to use stainless steel screws as fasteners. Hence, in such manufacturing industries, such conventional tools become ineffective as screw pick-up tools. Even in the case of non-Austenitic screws, such conventional tools remain ineffective as screw pick-up tools since the magnetic means do not provide a stable hold on the non-Austenitic screws.

In manual screw pick-up and tightening operations, operators typically pick up the screws manually before feeling and orienting the screw heads for engagement with a screw-driving tool. The operator using the screw-driving tool subsequently drives the screws into the visually located screw holes. For apparent reasons contributed by the dexterity, alertness, and the like acuity attributes of the operator, the manual screw pick-up and tightening operations are highly susceptible to problems like cross threading. Even with the use of the conventional pick-up tools mentioned in the foregoing, there still exist manifold problems because these conventional pick-up tools have inherent inadequacies.

In unique or special manufacturing conditions, stringent requirements for the screw tightening operations exist. For example, in the manufacture of computer hard disks, a stringent requirement of low particle count exists. This is because a computer hard disk is extremely sensitive to foreign or extrinsic particles. These particles may cause damage to the computer hard disk and therefore affect the yield of the manufacturing process. Such computer products involve high-precision operations such as the minute movements of the read/write head. Thus even a small particle that is not visually detectable may cause a failure in the computer hard disk. Therefore, many computer hard disks may be rejected on the manufacturing floor because of high foreign particle contamination. Due to this stringent requirement, the screw tightening process in the manufacture of a computer hard disk cannot additionally contribute to the foreign particle count beyond certain industry standards.

Another stringent requirement often held as important is one that relates to the read/write head of a computer hard disk. Because numerous screws are used in the manufacture of the computer hard disk to fasten the parts used to form the product, inevitably the screw pick up tool is sometimes brought into close proximity with the read/write head of the hard disk. The slider head within the actuator arm of the read/write head is particularly sensitive to magnetic fields. Hence, conventional screw pick-up tools using magnets or applying magnetic fields to pick up screws are not suitable for use in such a context.

In view of the stringent requirements of the computer hard disk manufacturing industry, conventional tools involving suction means and magnetic means are often not suitable for use. For example, a tool that depends on unreliable suction means may inadvertently release or drop a screw due to the momentary loss of vacuum. If there is no loss of vacuum, the air removal device due to insufficient power may not produce a strong enough vacuum strength to hold on to a screw properly. This may result in the screw not being perpendicularly aligned for insertion into the screw hole. Cross threading may thus occur and this may introduce foreign particles into the computer hard disk. On the other hand, a conventional tool using magnetic means may not be used at all because of the inherent magnetic properties. From the foregoing, there clearly exists a need for a tool or apparatus that addresses or ameliorates at least one of the problems.

SUMMARY OF THE INVENTION

In accordance with a first aspect of the invention, there is provided an apparatus for use with a torque driver for enabling pick up of a screw and engagement of head of the screw. The apparatus includes a sleeve that longitudinally extends from and retracts into the apparatus. The apparatus further includes a gripper for gripping the screw head, the gripper being actuated by the sleeve wherein widening and closing of the gripper are dependent on extension and retraction of the sleeve.

In accordance with a second aspect of the invention, there is provided a method for picking up a screw and engaging the head of the screw using an apparatus that includes a sleeve, and a gripper. The method includes the step of extending and retracting the sleeve from and into the apparatus, respectively. The method also includes the step of and gripping the screw head by actuating the gripper with the sleeve wherein widening and closing of the gripper are dependent on extension and retraction of the sleeve.

In accordance with a third aspect of the invention, there is provided a tool that is coupled to a torque driver for picking up a screw and engaging the head of the screw. The tool includes means for gripping the screw head. The tool also includes means for engaging the screw head and means for transmitting torque from the torque driver to the engaging means and for longitudinally extending and retracting the engaging means from and into the tool, respectively.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIGS. 5(a) and 5(b) illustrate the apparatus in FIGS. 1(a) to 1(d) coupled to the screwdriver shown in FIG. 4, for the screw pick-up and tightening operations.

DETAILED DESCRIPTION OF THE PREFERRED EMBODIMENT

To meet the need established in the foregoing, a tool or apparatus that adequately picks up screws of varying types and sizes, centers the screws, aligns the screws co-axially with the tool for perpendicularity with the screw holes, and bears no magnetic properties is provided.

A tool or apparatus, a method, and a manufacturing system for providing screw pick-up and tightening operations are disclosed. In particular, a screw pick-up apparatus that engages and grips the head of a screw, and centers and squares the screw head so that there is co-axial alignment with the apparatus for screw fastening purposes is disclosed. In the following description of several embodiments, numerous details are described in order to provide a more thorough description of these embodiments. From the disclosure herein, it will be apparent to one skilled in the art, however, that the invention may be practiced without those specific details. In other instances, well known details have not been described at length so as not to obscure the invention.

The advantages of the embodiments of the invention are manifold. One advantage is that at least one embodiment provides a self-engaging bit for engaging a recess in a screw head. Another advantage is that at least one embodiment provides a self-centering gripper for locating the axial center of a screw. A further advantage is that at least one embodiment provides a datum for referencing the height of a screw that is picked up. A yet further advantage is that at least one embodiment provides a self-alignment surface for co-axially aligning with the embodiment a screw that is picked up. A still further advantage is that at least one embodiment provides for screw pick-up and tightening operations without using magnetic fields.

By providing at least one or a combination of the foregoing advantageous features, an embodiment of the invention is therefore capable of providing solutions to at least one or a combination of the manifold problems faced in screw fastening operations and due to the use of conventional screw pick-up tools. In particular, such an embodiment is capable of providing an operator who is performing manual screw pick-up and tightening operations with a solution to the problem of cross threading. The foreign particle contamination in computer hard disk manufacturing industries can also be minimized with the use of the embodiment.

Furthermore, with the provision of the screw height-referencing feature, the embodiment is easily adaptable for use in automated screw pick-up and tightening operations. Even furthermore, the embodiment is suitable for implementation in computer hard disk manufacturing industries since magnetic fields are not used for the screw pick-up and tightening operations. FIGS. 1(a) to 1(d) provide cross sectional views of an apparatus for performing screw pick-up and tightening operations in accordance with a preferred embodiment of the invention. The apparatus for screw pick-up and tightening operations, hereinafter generally known as the apparatus 100, is shown with the tip either in proximity or in contact with a screw 108 in the cross sectional views. The cross sectional views of the apparatus 100 are also provided in a manner such that a bit 102, a sleeve 104, and a gripper 106 are shown. A screw feeder 118 is also shown in the cross sectional views. A housing 110 encases the bit 102, sleeve 104, and gripper 106. The sleeve 104, preferably a cylinder with a coaxial cylindrical internal cavity, also encases the bit 102, preferably a hardened shaft with a shaped tip for driving the screw 108. The gripper 106 is preferably a jaw-like gripping part with fingers, and the housing 110 is preferably cylindrical in shape. The bit 102, sleeve 104, gripper 106 and housing 110 preferably rotate synchronously.

Within the encasement of the housing 110, the sleeve 104 is also preferably encased by a sleeve housing 520. The sleeve housing 520 serves as an intermediary between the sleeve 104 and the housing 110 and provides protection for the sleeve 104. The sleeve housing 520 follows the sleeve 104 rotationally but does not follow the longitudinal movements of the sleeve 104. The housing 110 is preferably fastened to the sleeve housing 520 using conventional fastening means.

The housing 110 and sleeve housing 520 are components of the apparatus 100 from or into which the bit 102 and sleeve 104 extend or retract, respectively. The sleeve 104, whether extended or retracted, and the housing 110 protrude from the sleeve housing 510 longitudinally in the direction of the screw 108. The gripper 106 is disposed between the ends of the housing 110 and sleeve housing 520 where the upper surfaces of the gripper 106 are adjacent the end of the sleeve housing 520 and the lower surfaces of the gripper 106 are flush with the end of the housing 110.

In the screw pick-up and tightening operations, the screw 108 is typically supplied in a manner that eases the pick-up of the screw 108. The screw 108 has a screw head 112 and a threaded body 114. There are several types of screw heads and the screw head 112 shown is generally known as a "cheese head", where the screw head 112 resembles a flat circular disk of a substantial thickness. A recess 116 is typically found on top of the screw head 112. To drive the screw 108 into a screw hole, torque is provided to the recess 116 through the shaped tip of the bit 102 or other like screw driving tools. There are several types and shapes of recesses, one of which is a straight groove recess and another is a crucifix recess. A further example is a star-shaped recess commonly known also as a "torx-plus" recess. To supply the screw 108 for the screw pick-up and tightening operations in a manner so that the apparatus 100 easily picks up the screw 108, the feeder 118 is provided. The feeder 118 includes a cavity into which the threaded body 114 of the screw 108 is disposed. The feeder 118 also includes an upward facing opening lip on which the bottom of the screw head 112 rests. The opening lip of the feeder 118 is typically smaller than the circumference of the screw head 112. This enables the circumference of the screw head 112 to protrude sideways from the feeder 118 for an easy screw pick-up operation.

Figure 1A:
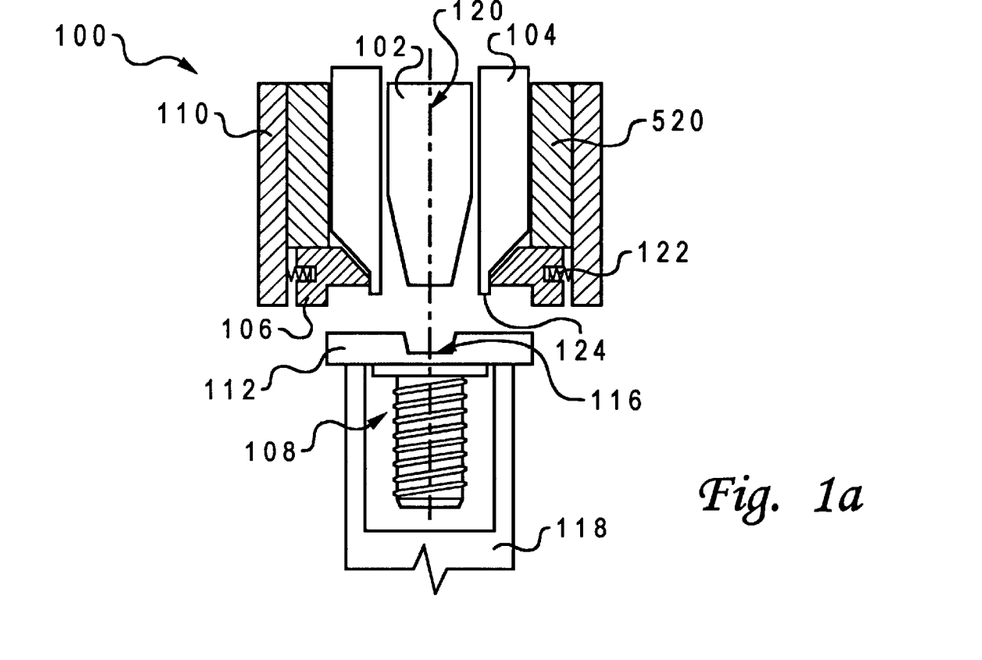
FIGS. 1(a) to 1(d) illustrate a screw pick-up operation using an apparatus in accordance with an embodiment of the invention.

FIG. 1(a) shows the relative positions of the apparatus 100, the screw 108, and the feeder 118. For ease of description, the feeder 118 is taken as a reference. Therefore, any movement or direction described hereinafter using arrows is made with reference to the feeder 118. Also, reference is drawn from a reference axis 120 that is congruent with the longitudinal axes of the bit 102 and the screw 108. The reference axis 120 is also congruent with the longitudinal axes of the sleeve 104 and the housing 110.

In FIG. 1(a) it is shown that the sleeve 104 is lowered, the bit 102 is raised, and the apparatus 100 is clear of the screw head 112, and the gripper 106 is closed. The apparatus 100 is in a "pre-engagement" state in this case.

As shown in the cross-sectional view in FIG. 1(a), portions of the closed gripper 106 on both sides of the reference axis 120 contain chamfered surfaces. These chamfered surfaces are contiguous to the upper surfaces of the gripper 106 and are obliquely facing away from the top surface of the screw head 112. The chamfered surfaces subsequently level off to form "stop" surfaces for determining the closed position of the gripper 106. These stop surfaces face inwardly and toward the reference axis 120, and are also parallel with the reference axis 120. The gripper 106 surrounds the bit 102 and the sleeve 104, preferably in the proximity of the shaped tip of the bit 102 and the tip of the sleeve 104. The chamfered surfaces on the gripper 106 are in close proximity and parallel with corresponding chamfered surfaces on the lowered sleeve 104. These chamfered surfaces are therefore obliquely facing the top surface of the screw head 112. An annular ring 124 extends from the chamfered surfaces on the sleeve 104 and forms the lip of the sleeve 104.

Springs are located between portions of the housing 110 and portions of the gripper 106 on both sides of the reference axis. At least a portion of each spring 122 is housed in a notch or groove formed in the gripper 106. The end of each spring 122 opposite this portion is fastened to the internal wall of the housing 110. Each spring 122, normally extended, is compressed as shown in FIG. 1(a). Therefore, each compressed spring 122 in turn provides a force that biases the corresponding portion of the gripper 106 towards the reference axis 120. A force provided by the annular lip 124 of the sleeve 104 in abutment with the corresponding stop surfaces of the gripper 106, however, counters this force. Therefore, the annular lip 124 of the sleeve 104 keeps in abeyance the portions of the gripper 106 that are biased towards the reference axis 120 by the springs 122. Consequently, the gripper 106 is maintained in the closed position. The bit 102, through which the reference axis 120 is depicted extending, transfers the torque that drives the screw head 112 for tightening the screw 108 into a screw hole. The torque is provided about the reference axis 120, and is initially transferred to the bit 102 through a tool adaptor unit (not shown). The torque is subsequently provided to the recess 116 in the screw head 112 through the tip of the bit 102. The tool adaptor unit is discussed in more detail with reference to FIGS. 5(a) and 5(b).

Figure 1B:
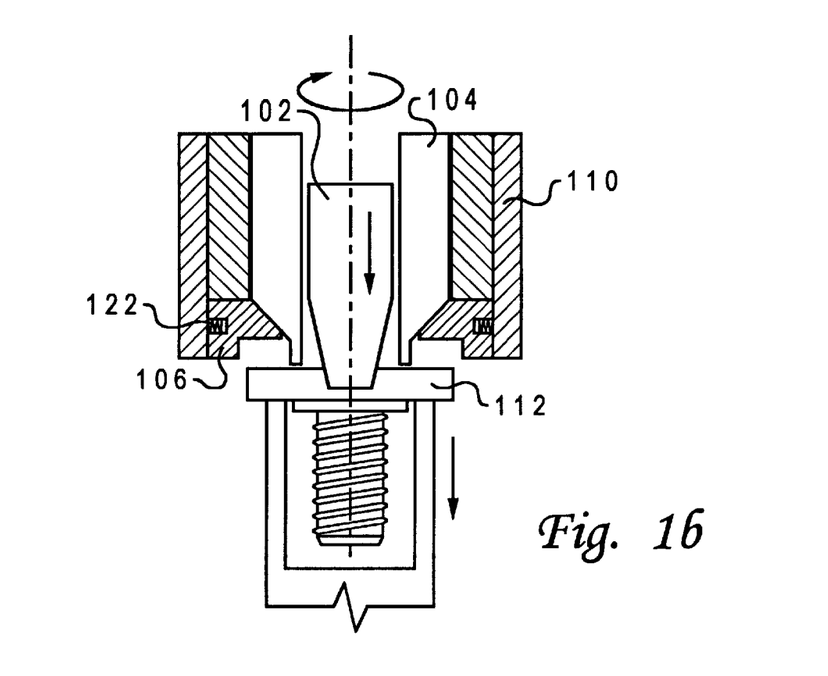

FIG. 1(b) illustrates the apparatus 100 lowered and the bit 102 extended from the arrangement shown in FIG. 1(a). The apparatus 100 is in an "engagement" state for engaging the screw head 112. By first extending the bit 102, the apparatus 100 attempts to fit the shaped tip of the bit 102 into the recess 116. Upon contact with the screw head 112, torque is provided to the apparatus 100 to turn the bit 102, preferably through one revolution for locating the recess 116 if the initial attempt fails and ensuring a suitable fit between the bit 102 and the recess 116. When an adequate fit between the shaped tip of the bit 102 and the recess 116 is found, the apparatus 100 is further lowered towards the screw head 112. To enable the gripper 106 to envelop the top of the screw head 112, the sleeve 104 is extended, preferably lagging behind the extension of the bit 102. When the sleeve 104 is extended, the chamfered surfaces on the sleeve 104 make contact with the chamfered surfaces on the gripper 106. During abutment of these surfaces, the downward force of the extending sleeve 104 is translated into outward forces thereby pushing the gripper 106 outwards. As a result, the springs 122 are further compressed and the gripper 106 widen or open.

Figure 1C:
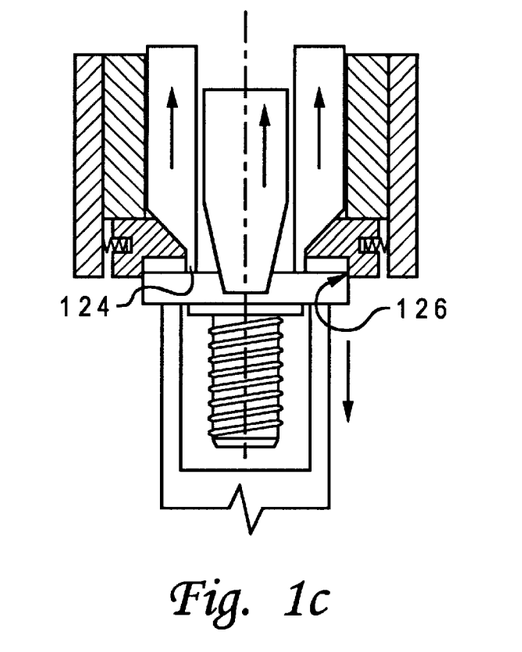

When the apparatus 100 is further lowered towards the screw head 112 into a "gripping" state in FIG. 1(c), the bit 102 is correspondingly raised or retracted into the apparatus 100 from the arrangement shown in FIG. 1(b). The effect of this is that the bit 102 does not protrude as much from the apparatus 100 in FIG. 1(b). The sleeve 104, encasing the bit 102, is simultaneously raised or retracted into the apparatus 100. The bit 102 is raised or retracted into the apparatus 100 so that the shaped tip of the bit 102 is in a state of dynamic equilibrium with the recess 116. This ensures that unnecessary additional forces do not act on the recess 116 and hence the screw head 112 as the apparatus 100 is lowered onto the screw head 112. The sleeve 104, on the other hand, relies on the forces of the compressed springs 122 that extend inwardly for pushing the gripper 106 inwardly so that the sleeve 104 is raised or retracted into the apparatus 100. The chamfered surfaces on the gripper 106 and the sleeve 104 cooperatively translate these inward forces into upward forces on the sleeve 104. The upward forces cause the sleeve 104 to raise or retract into the apparatus 100. At the same time, when contact is made between the top surface of the screw head 112 and the tip of the annular lip 124 of the sleeve 104, the screw head 112 exerts an upward force on the sleeve 104. This force also contributes to raising and retracting the sleeve 104 into the apparatus 100. Hence, the sleeve 104 is raised or retracted into the apparatus 100 as the tip of the sleeve 104 makes contact with the top of the screw head 112. The annular lip 124, on both sides of the reference axis 120, has surfaces that are preferably obliquely facing the top surface of the screw head 112. However, these surfaces are less sloped than the chamfered surfaces on the sleeve 104 to which these surfaces are contiguous. When the sleeve 104 is raised or retracted into the apparatus 100, a point is reached when the stop surfaces on the gripper 106 abut these surfaces on the annular lip 124. As the stop surfaces on the gripper 106 are substantially parallel to the reference axis, there is little or no translation of the inward forces of the springs 122 into upward forces on the sleeve 104. Hence, the gripper 106 stops contributing to the raising or retraction of the sleeve 104 into the apparatus 100. The sleeve 104 is largely raised or retracted into the apparatus 100 by the force from the top of the screw head 112 interacting with the tip of the annular lip 124. Also, as the sleeve 104 is raised or retracted into the apparatus 100, the annular lip 124 slides past the stop surfaces on the gripper 106. Since the surfaces of the annular lip 124 in contact with the stop surfaces on the gripper 106 gradually draw closer to the reference axis as the annular lip 124 extends away from the sleeve 104, the gripper 106 gradually closes in on the circumference of the screw head 112 as the sleeve 104 is raised or retracted into the apparatus 100. The gripper 106 closes at slower rate than when the chamfered surfaces of the sleeve 104 and gripper 106 are in contact. As a result, when the apparatus envelops the top of the screw head 112, gripping portions 126 of the gripper 106 slowly closes in on the circumference of the screw head 112. However, during the simultaneous lowering of the apparatus 100 and closing of the gripper 106, the gripping portions 126 of the gripper 106 remain wide or open enough to receive the screw head 112. Preferably, space between the gripping portions 126 of the gripper 106 and the circumference of the screw head 112 is provided. This is to ensure that during the lowering of the apparatus 100 over the screw head 112, there is minimal or no contact between the gripper 106 and the screw head 112 until the top of the screw head 112 contacts the lower surfaces of the gripper 106.

Figure 1D:
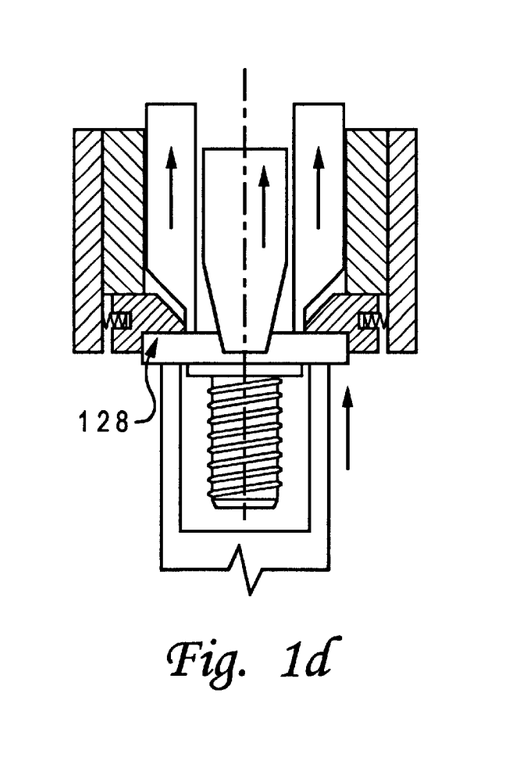

When the apparatus 100 is in a "gripped" state as shown in FIG. 1(d), the apparatus 100 is further lowered from the arrangement in FIG. 1(c) where the top of the screw head 112 abuts the undersurfaces of the gripping area of the gripper 106. These undersurfaces are known as datum surfaces 128. Preferably, the datum surfaces 128 lie on a same plane that is orthogonal to the reference axis 120. At the point of contact between the datum surfaces 128 and the top of the screw head 112, the apparatus 100 stops raising or retracting the bit 102. Also, the tip of the annular lip 124 of the sleeve 104 remains flush with the datum surfaces 128. When this happens, the chamfered surfaces on the sleeve 104 and the gripper 106 are already disengaged, and the gripper 106 is in a most inwardly position because the stop surfaces on the gripper 106 are closest to the reference axis 120. The upward forces contributed by the top of the screw head 112 and the gripper 106 cease to act on the sleeve 104. The sleeve 104, therefore, stops retracting or raising into the apparatus 100. A grip is instead formed around the circumference of the screw head 112. Thereafter, the apparatus 100 lifts the screw 108 from the feeder 118. While picking up the screw 108, however, the apparatus 100 continues to engage the screw head 112 through the best fit between the bit 102 and the recess 116. This is to ensure that by the time the screw 108 is inserted into a screw hole, the apparatus 100 is immediately ready to drive the screw 108 into the screw hole.

To continue with the screw pick-up and tightening operations, the apparatus 100 is moved by an automated system or by the operator's manual effort to a position over the screw hole. By lowering the apparatus 100, the screw 108 is thus lowered and the tip of the threaded body 114 inserted into the screw hole. When the tip of the threaded body 114 is in the screw hole, the apparatus 100 is rotated through several revolutions, for example, three revolutions, so that the threaded body 114 engages the pre-formed internal thread of the screw hole. The bit 102 and sleeve 104 subsequently start lowering or extending from the apparatus 100 as rotation continues. When the sleeve 104 is extended or lowered lagging the extension of the bit 102, the chamfered surfaces of the sleeve 104 and the gripper 106 abut. Again, as this happens, the downward travel of the sleeve 104 is translated into the outward movement of the gripper 106. The gripper 106 is thus widened or opened, thereby causing the apparatus 100 to release the screw head 112. However, the apparatus 100 continues to be lowered, and the bit 102 continues to be lowered or extended from the apparatus 100. Torque continues to be applied through the bit 102 to the recess 116 for driving the screw 108 into the screw hole.

Figure 2:
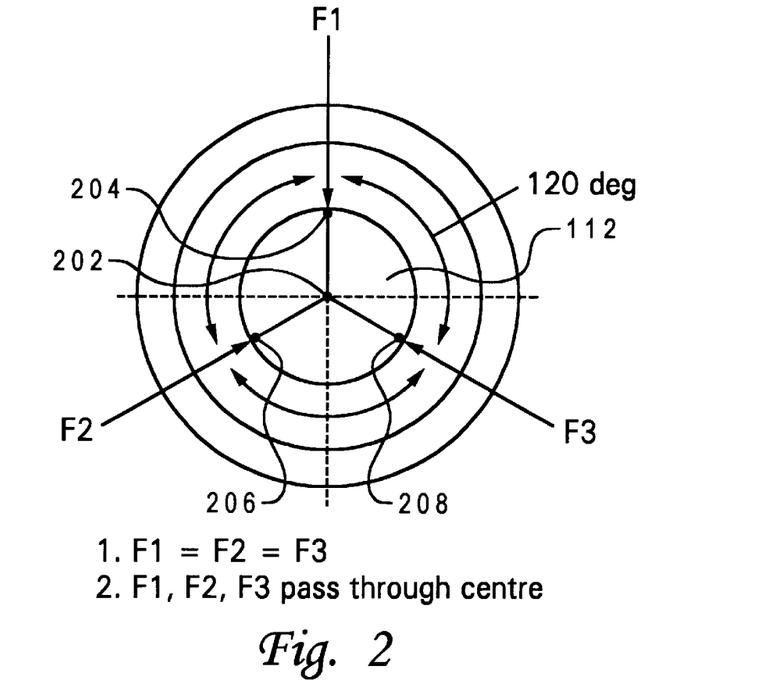
FIG. 2 is a diagram illustrating the mechanical centering operation of a gripper on the apparatus shown in FIGS. 1(a) to 1(d)
Figure 3:
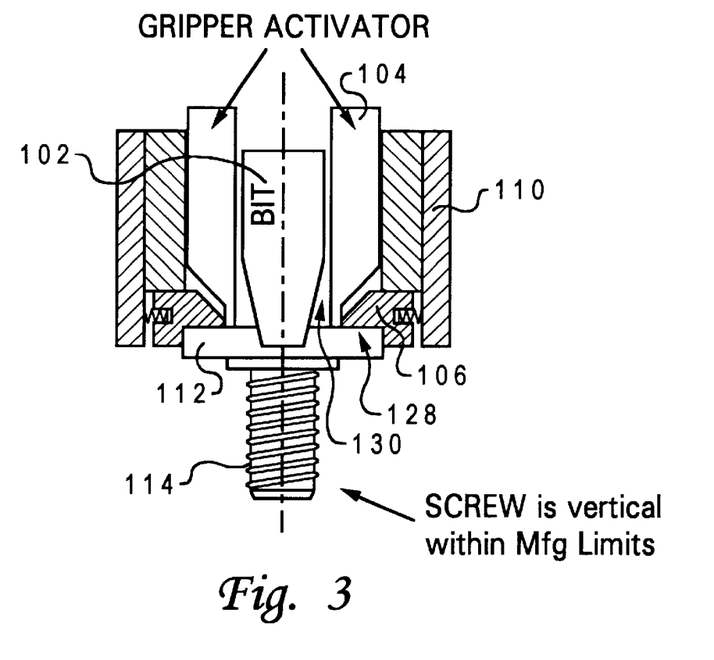
FIG. 3 is a cross-sectional diagram depicting an operation for straightening a screw which has been gripped by the apparatus shown in FIGS. 1(a) to 1(d)

To describe the self-centering, self-aligning, and height referencing features provided by the embodiments of the invention, reference is made to FIGS. 2 and 3 to describe in further details the gripper 106. FIG. 2 depicts a mechanical centering operation diagram in which the gripping positions of the gripper 106 on the screw head 112 are shown from a plan view, with the forces that are provided by the gripper 106 overlaying the various gripping positions. These gripping forces are of equal amplitude and are represented by arrows F1, F2, and F3. As shown in FIG. 2, there are three positions 204, 206 and 208 from which the gripper 106 applies a three-point grip on the screw head 112. Hence, the gripping forces F1, F2 and F3 overlay the positions 204, 206 and 208 respectively. For the mechanical centering concept to apply, the screw 108 is assumed to have a substantially circular screw head 112 with an axial center, represented by a reference point 202, that coincides with the longitudinal axis of the threaded body 114. The three-point grip provided by the gripping portions 126 is preferably applied around the circumference of the screw head 112 at points that are angularly displaced at 120o apart. As a result, the gripping forces F1, F2, and F3 coincide at the reference point 202, thereby causing the gripper 106 to center the screw head 112.

The gripper 106 may be configured to grip the screw head 112 at more than three points, but the practical effect of doing so is that it becomes increasingly difficult to coincide the forces being applied at each gripping point at the reference point 202.

Figure 4:
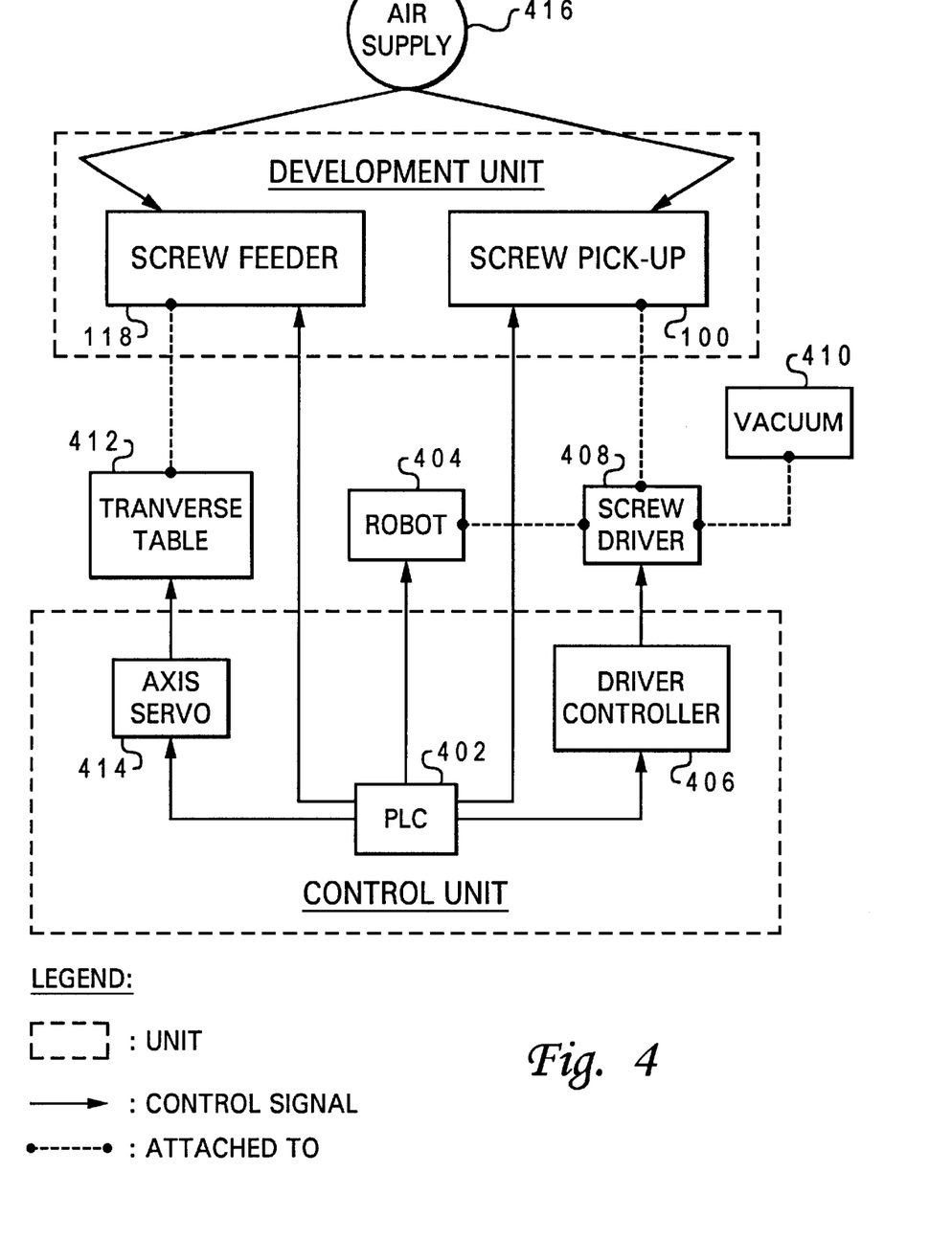
FIG. 4 is a high level diagram illustrating the modules which include the apparatus shown in FIGS. 1(a) to 1(d), a screw feeder, a screw driver, and a control unit, all of which form a screw pick-up system implementable on a production or a manufacturing floor for performing screw pick-up and tightening operations.

With reference to FIG. 3, the self-aligning and screw height referencing features of the apparatus 100 are described. In the foregoing description, the datum surfaces 128 lie in a plane that is perpendicular to the reference axis 120. When the apparatus 100 is lowered towards the feeder 118, contact is made between the datum surfaces 128 and the top of the screw head 112. With the assumption that the top of the screw head 112 is also planar and the longitudinal axis of the threaded body 114 is perpendicular to the planar top surface of the screw head 112, the screw 108 when gripped by the gripper 106 is thereby aligned. That is, the longitudinal axis of the threaded body 114 is aligned with the reference axis 120 when the datum surfaces 128 engages the top planar surface of the screw head 112. Consequently, this provides a means of ensuring that the screw 108 is inserted perpendicularly into the screw hole when the apparatus 100 is held perpendicularly to the screw hole. The datum surfaces 128 are also used for height referencing purposes. That is, when proper and full contact between the datum surfaces 128 and the planar top surface screw head 112 is made, the plane formed by the datum surfaces 128 provides a reference plane from which the height of the screw 108 is measurable. This feature is particularly useful in enabling the apparatus 100 to be used conjunctively with an automated screw pick-up and tightening system implementable on production or manufacturing floors. Such automated systems typically rely on referencing means to perform screw pick-up, screw tightening, screw holes locating, and the like operations. Typically height, distances, elevations, and the like measurements are critical information on which such automated systems rely for performing those operations. Such an automated system is shown in FIG. 4. In addition, the apparatus 100 in the embodiments of the invention also provides a means of removing foreign particles that are produced during the screw tightening operations. Although the apparatus 100 has provisions for self-centering and self-aligning operations, which thereby ensure perpendicularity during the insertion of the screw 108 into the screw hole, foreign particles may still be present. This may be due to foreign particles produced as a result of cross-threading caused by variations in the dimensions of the screws 108 and/or the screw holes. Foreign particles may also be already present in the screw holes or the surrounding areas of the screw holes before the screw tightening operations are performed. To remove these foreign particles, the apparatus 100 is provided with a vacuum path.

As described hereinbefore, the sleeve 104 encases the bit 102. However, there is provided in the apparatus 100 space between the bit 102 and the surrounding sleeve 104 which forms a vacuum path 130 that envelops the bit 102. The vacuum path 130 is provided by an air removal device (not shown) connectable to the apparatus 100, as known to those skilled in the art.

For implementation of the apparatus 100 on production or manufacturing floors, the apparatus 100 is used in conjunction with other modules to form an automated manufacturing system as shown in FIG. 4.

Typically, such an automated system includes a Programmable Logic Controller (PLC) 402, a robot 404, the screw feeder 118, the screw pick-up apparatus 100, and a screw driver 408. The PLC 402 provides control logic to synchronize and co-ordinate the operations of most of the modules shown in FIG. 4.

In the automated system, the apparatus 100 is coupled to the screw driver 408 so that the torque provided by the screw driver 408 can be used to drive the bit 102 and the sleeve 104. A vacuum 410 is also connected to the screw driver 408 so that the screw driver 408 may in turn remove air to provide suction to the apparatus 100 for removing foreign particles. The screw driver 408 is also connected to the robot 404, which amongst other things, performs the screw pick-up and tightening operations with automated actions. The PLC 402 controls the screw driver 408 through a driver controller 406.

The PLC 402 also controls the screw feeder 118. To provide the screw feeder 118 with transverse motion, a transverse table 412 on which the screw feeder 118 is placed is provided. The transverse table 412 is controlled by an axis servo 414, which is in turn controlled by the PLC 402. The axis servo 414 is a servomechanism that provides control and movement of the transverse table 412 in the various axes. An air supply 416 is also connected to the apparatus 100 and the screw feeder 118. The air supply 416 provides air pressure for actuating mechanisms in the apparatus 100 to provide the movements of the bit 102 and sleeve 104.

The mechanical coupling between the screw driver 408 and the apparatus 100 is further described with reference to FIGS. 5(a) and 5(b). The coupling is made possible through a tool adaptor unit shown in FIGS. 5(a) and 5(b). The tool adaptor unit includes a driver adaptor 502 and a bit adaptor 504. The driver adaptor 502 provides a mechanical interface between the apparatus 100 and the screw driver 408, and is dependent on the size and type of coupling used on the screw driver 408. When a different screw driver 408 is used, and therefore a different coupling, the driver adaptor 502 is changed. Similarly, the bit adaptor 504 is dependent on the size and the type of the bit 102 used. The tool adaptor unit also includes a series of air inlets 506. These air inlets 506 are connected to the air supply 416 for receiving air into air chambers where pushers 508 are movably disposed. The pushers 508 are "piston" like devices which, when coerced by the air pressure, push against a drive collar 510. The drive collar 510 is coupled to the bit adaptor 504. The pushers 508 and the device collar 510 are encased by a pickup housing 512. Both the drive collar 510 and the pickup housing 512 are preferably cylindrical in shape. The bit adaptor 504 is also preferably cylindrical in shape. This allows the bit adaptor 504 and the drive collar 510 to be aligned coaxially for the torque to be transferred from the screw driver 408 to the driver adaptor 502, then to the bit adaptor 504, and also to the drive collar 510.

The drive collar 510 narrows substantially to form a shoulder as the drive collar 510 extends away from the bit adaptor 504. The pickup housing 512 is reciprocally narrowed by an annular ring to form an internal ledge which is also cylindrical. The annular ring is a bearing clamp ring 516. Between the shoulder of the device collar 510 and the bearing clamp ring 516, there is a spring 514. The spring 514 coils around the narrowed neck of the drive collar 510 which protrudes downwardly, while at the same time the opposite ends of the spring 514 rest on the shoulder of the drive collar 510 and the bearing clamp ring 516, respectively.

The narrowed neck of the drive collar 510 is coupled to the bit 102 at the end opposite the shaped tip of the bit 102. The portion of the bit 102 coupled to the drive collar 510 is hour-glass shaped. The constriction at the hour-glass portion preferably has substantially the same diameter as the shaft diameter of the bit 102. The bit 102 narrows after the hour-glass portion, and thus forms a gradually inclining shoulder.

At the hour-glass portion of the bit 102, the sleeve 104 begins to encase the bit 102. However, at the inclined shoulder of the bit 102, the internal cavity of the sleeve 104 forms a reciprocating inclined or tapering ledge. The inclined ledge on the internal cavity of the sleeve 104 acts as a stopper to the extension of the bit 102 relative to the sleeve 104. That is, the bit 102 cannot extend from the apparatus 100 beyond a pre-determined distance without causing a corresponding extension of the sleeve 104.

The internal cavity of the sleeve 104 subsequently abruptly narrows to form a sharp ledge. Between the inclined shoulders on the bit 102 and the sharp ledge on the internal cavity of the sleeve 104, there is another spring 518. The spring 518 biases the relative displacement between the bit 102 and the sleeve 104 such that the tip of the bit 102, under normal conditions, does not extend beyond the tip of the annular lip 124 of the sleeve 104.

The sleeve housing 520 acts as a stopper to the extension of the sleeve 104, and therefore to the extension of the bit 102. This is done by providing reciprocating stopping surfaces such as shoulders and ledges on the outer surface of the sleeve 104 and the internal surface of the sleeve housing respectively. Hence, the stopping surfaces limit the extension of the bit 102 and the sleeve 104 from the apparatus 100 to a pre-determined distance.

As described hereinbefore, the components in the tool adaptor unit and the apparatus 100 interconnect and interact to form a system for providing the apparatus 100 with rotational as well as longitudinal motion.

When torque is provided to the device adaptor 502, the torque is relayed to the bit adaptor 504 and in turn to the drive collar 510. The drive collar 510 in turn relays the torque to the bit 102, the sleeve 104, and the sleeve housing 520. Between the sleeve housing 520 and the pickup housing 512, there are preferably bearings 522 for substantially reducing the friction between the two caused by a rotating sleeve housing 520 following the rotating sleeve 104. Additionally, there are preferably bearings 522 between the bearing clamp ring 516 and the sleeve housing 520 for the same purpose of reducing the friction caused by the sleeve 104.

When a longitudinal movement of the bit 102 and/or the sleeve 104 is required, for example, to either extend or lower, or to raise or retract the bit 102, air is supplied and maintained or cut by the air supply 416, respectively. In FIG. 5(a) where springs 514 and 518 are extended, the system is in a normal state. That is, the drive collar 510 is raised and the bit 102 is raised.

Since the bit 102 is not extended, the inclined shoulder on the bit 102 does not abut the reciprocating inclined ledge on the internal cavity of the sleeve 104. The sleeve 104 is therefore also raised to the extent that the chamfered surfaces on the sleeve 104 and the gripper 106 allow in respect of the extension forces provided by the springs 122. When air is provided to the air inlets 506, the pushers 508 are pushed down as shown in FIG. 5(b). The drive collar 510 is pushed down and therefore the bit 102 is pushed down. As a result, the springs 514 and 518 are respectively compressed. When the bit 102 is extended far enough, the inclined shoulder on the bit 102 abuts the reciprocating inclined ledge on the internal cavity of the sleeve 104. As the bit 102 extends further, the sleeve is thus also extended, although lagging at a distance behind the bit 102.

When air from the air supply 416 is cut, the springs 514 and 518 extend thereby pushing upwards the drive collar 510 and the bit 102 in relation to the sleeve 104. When the sleeve 104 is held in abeyance by the gripper 106 through the chamfered surfaces on both, the spring 518 extends to a degree for providing a state of spatial equilibrium as shown in FIG. 5(a). In this state, there is a clearance between the inclined shoulder of the bit 102 and the inclined ledge on the internal cavity of the sleeve 104. There is also a clearance between the stopping surfaces on the sleeve 104 and the sleeve housing 520.

Figure 5A:
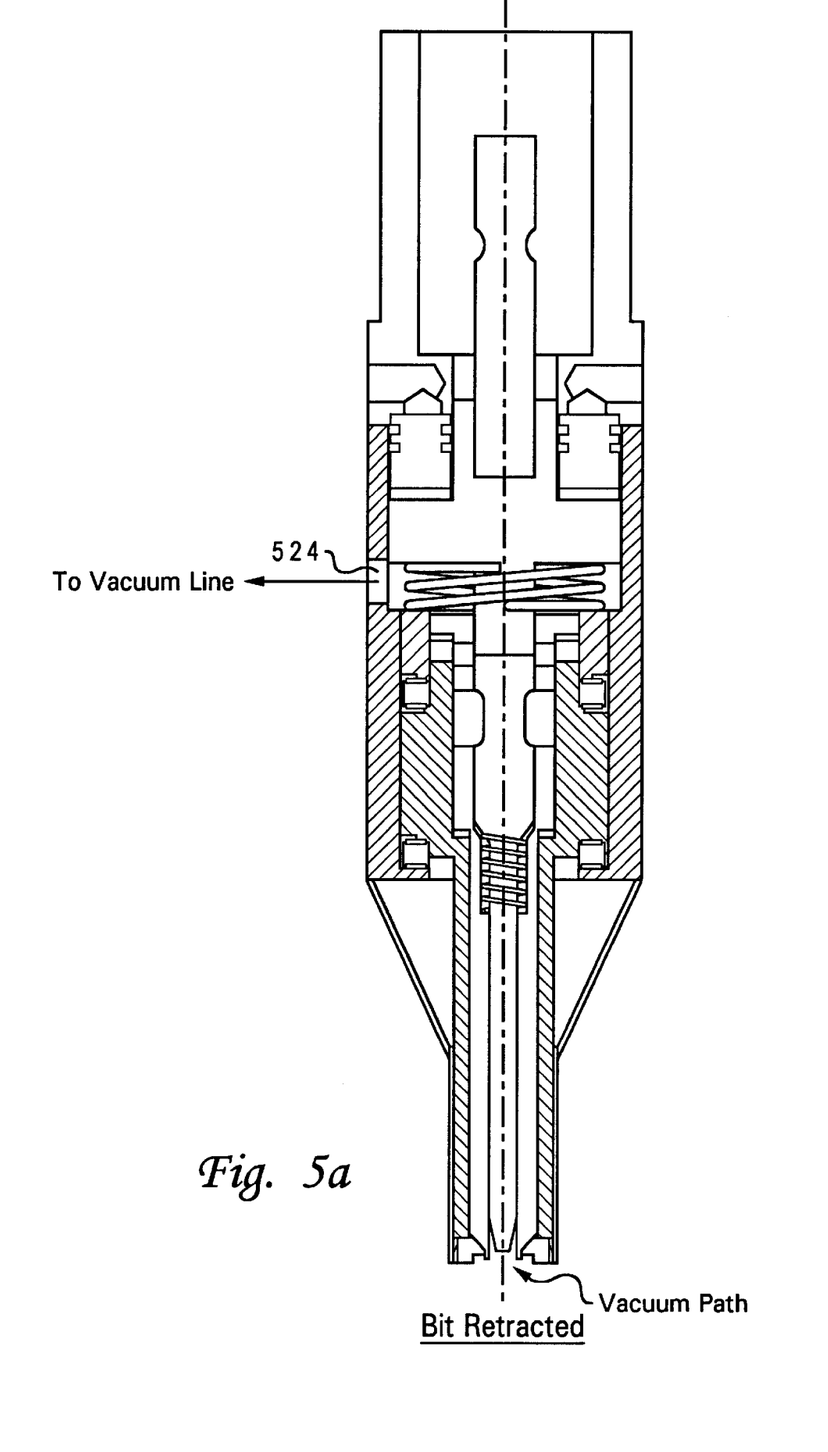

Regardless of whether the system is in a state as shown in FIG. 5(a) or 5(b), the vacuum path is consistently in fluid communication with a vacuum outlet 524. The vacuum outlet 524 leads away from the space formed between the shoulder of the drive collar 510 and the bearing clamp ring 516.

The system described using FIGS. 5(a) and 5(b) may be attached to the automated system described using FIG. 4. Alternatively, the system may be attached to a manual screw driver with an attached air supply. In the case of the automated system, the robot 404 is programmed to move in the X, Y and Z coordinates using teaching or the like methods. When the robot 404 moves the system to "taught" points, the subsequent movement of the system to other taught points are pre-determined and controlled so that, for example, the apparatus 100 is not lowered too far during a screw pick-up operation or a screw tightening operation. For an application of the system with a manual screw driver, the X, Y and Z movements of the system is controlled by the "feel" of the operator. For example, the operator is the one to gauge how far to lower the apparatus 100 based on the feel of the resistance from the screw head 112 during a screw pick-up operation.

The apparatus 100 and the tool adaptor unit described hereinbefore are fabricated using standard electro-static discharge (ESD) approved materials suitable for making screw pick-up and tightening tools or equipment. Such materials, which do not cause ESDs, are commonly known to those skilled in the art.

In the foregoing manner, a tool or an apparatus, a method, and an automated system for use in manufacturing, are described. In particular, the apparatus is used for screw pick-up and tightening operations. In doing so, the apparatus performs self-engaging, self-centering, self-aligning, and screw height referencing functions. The apparatus for screw pick-up and tightening operations also provides a screw pick-up mechanism without the use of magnetic fields. However, in view of the disclosure herein, one skilled in the art will appreciate that numerous changes and/or modification can be made without departing from the scope and spirit of the invention.

What is claimed is:

1. An apparatus for picking up a screw and engaging a head of the screw, the apparatus comprising:
    a sleeve having a longitudinal axis and adapted to longitudinally extend from and retract into the apparatus, wherein the sleeve contacts the head of the screw when the sleeve is extended; and
    a gripper for gripping the head of the screw, the gripper being actuated by the sleeve wherein widening and closing of the gripper are dependent on extension and retraction of the sleeve.

2. The apparatus as in claim 1, further comprising a bit adapted to be encased by the sleeve, the bit being rotatable about a longitudinal axis of the bit, longitudinally extendable from and retractable into the apparatus, and rotatably coupled to a torque driver for engaging and transmitting torque to the head of the screw.

3. The apparatus as in claim 1, wherein gripping portions of the gripper are disposed proximal to ends of the sleeve and a bit for picking up the head of the screw, and the end of the bit is extendable from the apparatus and protrudable beyond gripping portions of the gripper for engaging and transmitting torque to the head of the screw.

4. The apparatus as in claim 1, wherein the gripper is resiliently biased and linearly actuated to close inwardly.

5. The apparatus as in claim 1, wherein the gripper releasably abuts the sleeve for actuating the gripper.

6. The apparatus as in claim 1, wherein the gripper and the sleeve include at least a pair of chamfered surfaces that releasably abut for enabling non-pivotal, linear actuation of the gripper.

7. The apparatus as in claim 6, wherein the pair of chamfered surfaces releasably abut when the sleeve extends from the apparatus, the pair of chamfered surfaces translate further extension of the sleeve into widening of the gripper, and wherein when force further extending the sleeve substantially ceases to act, the gripper closes and the pair of chamfered surfaces translate inwardly biased closing of the gripper into retraction of the sleeve.

8. The apparatus as in claim 1, wherein gripping portions of the gripper provide a substantially spatially distributed three-point grip around the head of the screw.

9. The apparatus as in claim 2, wherein the encasement of the bit by the sleeve provides a vacuum path.

10. The apparatus as in claim 2, wherein the bit and the sleeve are substantially cylindrical and coaxial.

11. The apparatus as in claim 1, wherein the sleeve and the gripper provide complementing surfaces for stopping inwardly biased closing of the gripper at a predetermined distance from the longitudinal axis of the sleeve.

12. The apparatus as in claim 2, wherein the gripper further includes at least a surface for abutting an upper surface of the head of the screw for providing datum means for referencing a height of the screw and for co-axially aligning longitudinal axes of the bit and the screw.

13. A method for picking up a screw and engaging a head of the screw, comprising the steps of:
    providing an apparatus having a sleeve and a gripper;
    extending the sleeve from the apparatus into contact with the head of the screw; and
    gripping the head of the screw by actuating the gripper with the sleeve wherein closing of the gripper is dependent on retraction of the sleeve.

14. The method as in claim 13, further comprising the step of encasing a bit with the sleeve, the bit being rotatable about a longitudinal axis of the bit, longitudinally extendable from and retractable into the apparatus, and rotatably couplable to a torque driver for engaging and transmitting torque to the head of the screw.

15. The method as in claim 13, wherein the gripping step includes when widening the gripper outwardly away from a longitudinal axis of the sleeve, the gripper is dependent on the sleeve extending from the apparatus for receiving or releasing the head of the screw, and when closing the gripper inwardly towards the longitudinal axis of the sleeve, the gripper is dependent on the sleeve retracting into the apparatus for gripping the head of the screw.

16. The method as in claim 13, further comprising the step of disposing gripping portions of the gripper proximal to ends of the sleeve and a bit for picking up the head of the screw and extending from the apparatus and protruding beyond gripping portions of the gripper the end of the bit for engaging and transmitting torque to the head of the screw.

17. The method as in claim 14, further comprising the step of biasing resiliently the gripper to close inwardly.

18. The method as in claim 13, further comprising the step of abutting releasably the gripper and the sleeve for actuating the gripper.

19. The method as in claim 18, wherein the abutting step includes abutting releasably at least a pair of chamfered surfaces on the sleeve and the gripper for enabling the actuation of the gripper.

20. The method as in claim 19, wherein the abutting step further comprises abutting releasably the pair of chamfered surfaces when the sleeve extends from the apparatus and through angular resolution of force further extending the sleeve, translating further extension of the sleeve into widening of the gripper, and when force further extending the sleeve substantially ceases to act, the gripper closes and through angular resolution of force provided by inwardly biased closing of the gripper, translating inwardly biased closing of the gripper into retraction of the sleeve.

21. The method as in claim 13, further comprising the step of distributing gripping portions of the gripper for providing a substantially spatially distributed three-point grip around the head of the screw.

22. The method as in claim 14, further comprising the step of providing a vacuum path between the bit and the sleeve.

23. The method as in claim 14, further comprising the step of coaxially aligning the bit and the sleeve.

24. The method as in claim 13, further comprising the step of providing complementary surfaces on the sleeve and gripper for stopping inwardly biased closing of the gripper at a predetermined distance from a longitudinal axis of the sleeve.

25. The method as in claim 14, further comprising the step of providing at least a surface on the gripper for abutting an upper surface of the head of the screw for providing datum means for referencing a height of the screw and for coaxially aligning longitudinal axes of the bit and the screw.

26. A tool for picking up a screw and engaging a head of the screw, the tool comprising:
    a sleeve for longitudinally extending from and retracting into the tool;
    a gripper for gripping the head of the screw, the gripper being non-pivotally, linearly actuated by the sleeve, wherein opening and closing of the gripper are dependent on extension and retraction of the sleeve, respectively;
    a bit located coaxially and rotatable within the sleeve, wherein the bit is longitudinally extendable from and retractable into the tool;
    a torque driver; and
    means for transmitting torque from the torque driver to the bit for engaging and transmitting torque to the head of the screw, and for longitudinally extending and retracting the bit from and into the tool.

27. The tool as in claim 26, wherein the transmitting means comprises:
    an air inlet for receiving air pressure;
    a pusher having one end in fluid communication with the air inlet, the pusher adapted to translate air pressure into substantially longitudinal force;
    a resilient biasing element for enabling the pusher to be resiliently biased in a direction opposing air pressure provided by the air inlet; and
    a coupling device for coupling to the torque driver and the bit, the coupling device receiving substantially longitudinal force provided by the pusher and torque from the torque driver and transmitting the same to the engaging means.

28. The tool as in claim 27, wherein when the gripper widens outwardly away from a longitudinal axis of the sleeve, the gripper is dependent on the sleeve extending from the tool for receiving or releasing the head of the screw, and when the gripper closes inwardly towards the longitudinal axis of the sleeve, the gripper is dependent on the sleeve retracting into the tool for gripping the head of the screw.

29. The tool as in claim 28, wherein gripping portions of the gripper are disposed proximal to ends of the sleeve and bit for picking up the head of the screw and the bit end is extendable from the tool and protrudable beyond gripping portions of the gripper for engaging and transmitting torque to the head of the screw.

30. The tool as in claim 29, wherein the gripper is resiliently biased to close inwardly and the gripping portions of the gripper provide a substantially spatially distributed three-point grip around the head of the screw.

31. The tool as in claim 30, wherein the gripper and the sleeve include at least a pair of chamfered surfaces that releasably abut for enabling the actuation of the gripper, wherein the pair of chamfered surfaces releasably abut when the sleeve extends from the tool and through angular resolution of force further extending the sleeve, the pair of chamfered surfaces translate further extension of the sleeve into widening of the gripper, and wherein when force further extending the sleeve substantially ceases to act, the gripper closes and through angular resolution of force provided by inwardly biased closing of the gripper, the pair of chamfered surfaces translate inwardly biased closing of the gripper into retraction of the sleeve.

32. The tool as in claim 31, wherein the sleeve and the gripper provide complementary surfaces for stopping inwardly biased closing of the gripper at a predetermined distance from the longitudinal axis of the sleeve.

33. The tool as in claim 32, wherein the gripper further comprises at least a surface for abutting an upper surface of the head of the screw for providing datum means for referencing a height of the screw and for coaxially aligning the longitudinal axes of the bit and the screw.

* * * * *